United States Patent [19]

Stone

[11] Patent Number: 5,299,906
[45] Date of Patent: Apr. 5, 1994

[54] SELF-ADJUSTING PNEUMATIC LOAD ELEVATOR

[76] Inventor: Robert M. Stone, 9356 19th St. #E, Alta Loma, Calif. 91701

[21] Appl. No.: 695,692

[22] Filed: May 3, 1991

[51] Int. Cl.$^5$ .................................................. B65G 57/22
[52] U.S. Cl. ............................... 414/792.3; 414/792.2; 414/495; 187/18
[58] Field of Search ................... 414/925, 792.2, 792.3, 414/495; 187/18, 8.71, 17; 211/41, 49.1, 207, 59.3; 254/122

[56] References Cited

U.S. PATENT DOCUMENTS

| | | | |
|---|---|---|---|
| 1,212,341 | 1/1917 | Fowler | 271/160 X |
| 2,001,744 | 5/1935 | Patterson | 254/2 |
| 2,070,960 | 2/1937 | Phillips | 254/93 |
| 2,610,824 | 9/1952 | Grier | 254/93 |
| 2,806,607 | 9/1957 | Korngold et al. | 211/59.3 X |
| 2,980,287 | 9/1961 | Fisher | 312/71 |
| 3,091,503 | 5/1963 | Fisher | 312/71 |
| 3,174,722 | 3/1965 | Alm | 254/93 |
| 3,379,411 | 4/1968 | Vanderjagt | 187/18 |
| 3,659,913 | 5/1972 | Waldron et al. | 312/71 |
| 3,694,044 | 9/1972 | Cummings | 312/71 |
| 3,738,722 | 6/1973 | Kooiman | 211/59.3 X |
| 4,007,925 | 2/1977 | DeRyke et al. | 414/118 X |
| 4,688,760 | 8/1987 | Garman et al. | 254/122 |
| 4,764,075 | 8/1988 | Cox et al. | 211/59.3 X |
| 4,921,074 | 5/1990 | Ochs | 254/89 H |

FOREIGN PATENT DOCUMENTS

| | | | |
|---|---|---|---|
| 0335472 | 3/1989 | European Pat. Off. | B65G 1/07 |
| 3536043A1 | 4/1987 | Fed. Rep. of Germany | B65G 1/07 |
| 3801491A1 | 8/1989 | Fed. Rep. of Germany | 254/122 |
| 1282755 | 12/1962 | France | 254/93 HP |
| 1473991 | 3/1967 | France | 187/18 |

OTHER PUBLICATIONS

Principles of Vibration Isolation, by Daniel Vukobratovich, Society of Photooptical Instrumentation Engineers Journal (SPIE), vol. 732 (Bellingham, Wash. 1987).
(Date Uncertain) Knight Industries product brochure for Ergonomic Tilt Tables, Ergonomic Lift Tables, Ergonomic Container Shuttles, Ergonomic Lift & Tilt Tables, Ergonomic Lift & Rotate Tables.
1989 Palletpal product brochure, Southworth Products Corp., Portland, Me.
(Date Uncertain) Firestone Airstroke Actuators, Airmount Isolators Engineering Manual & Design Guide. See particularly p. 20 Scissor Lift, Case Packer, p. 83, 1T15S-6 Airstroke Actuator diagram and static data. Firestone Industrial Products Co., Noblesville, Ind.

Primary Examiner—David H. Bollinger
Attorney, Agent, or Firm—Antonio R. Durando; Harry M. Weiss

[57] ABSTRACT

A self-adjusting load elevator has a base, a horizontal load platform, a vertically expandable scissors linkage coupled between the load platform and the base, and an air actuator chamber. The air actuator chamber is formed of a compressible bellows and a fixed volume reservoir. The bellows is compressible between specified maximum and minimum bellows heights which correspondingly determine substantially different maximum and minimum bellows volumes and coupled between the scissors linkage and the load platform. The air reservoir is coupled to the bellows and has a fixed volume that is substantial compared to the difference between the maximum and minimum bellows volumes. A normally closed air inlet/outlet valve is coupled to the air actuator.

29 Claims, 11 Drawing Sheets

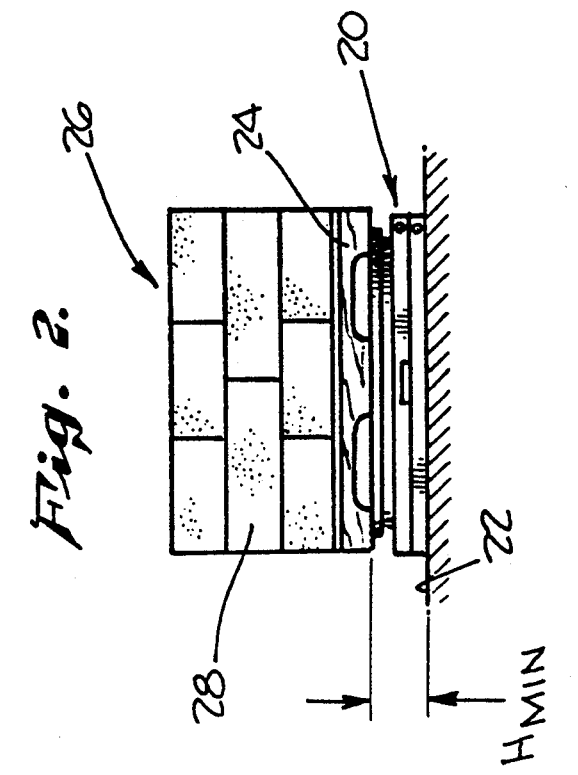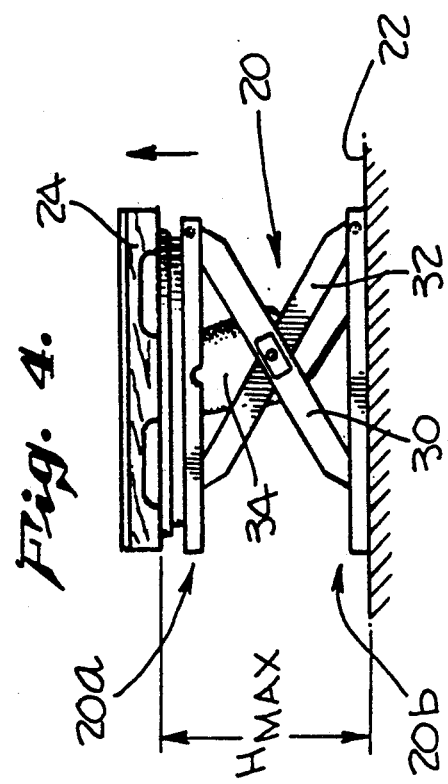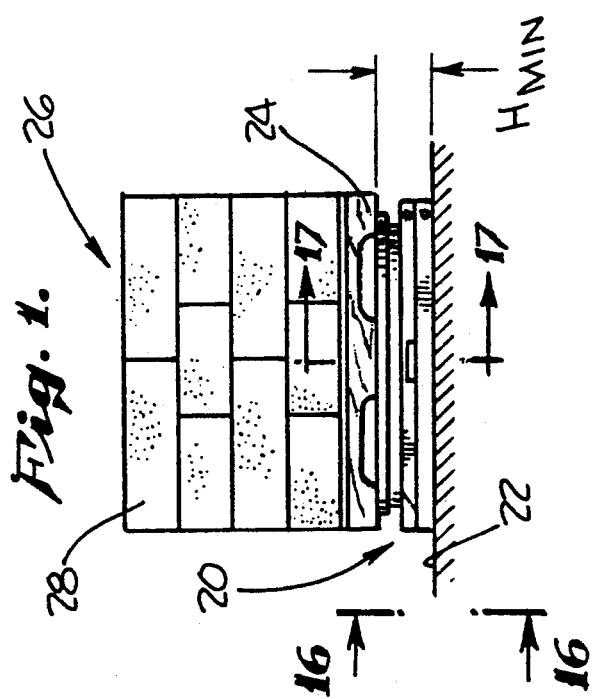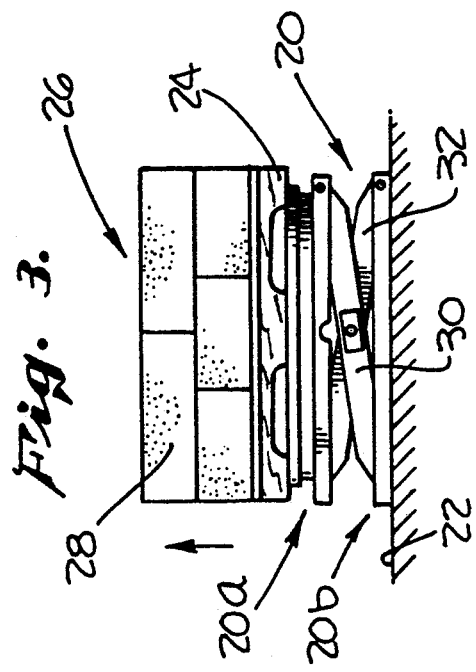

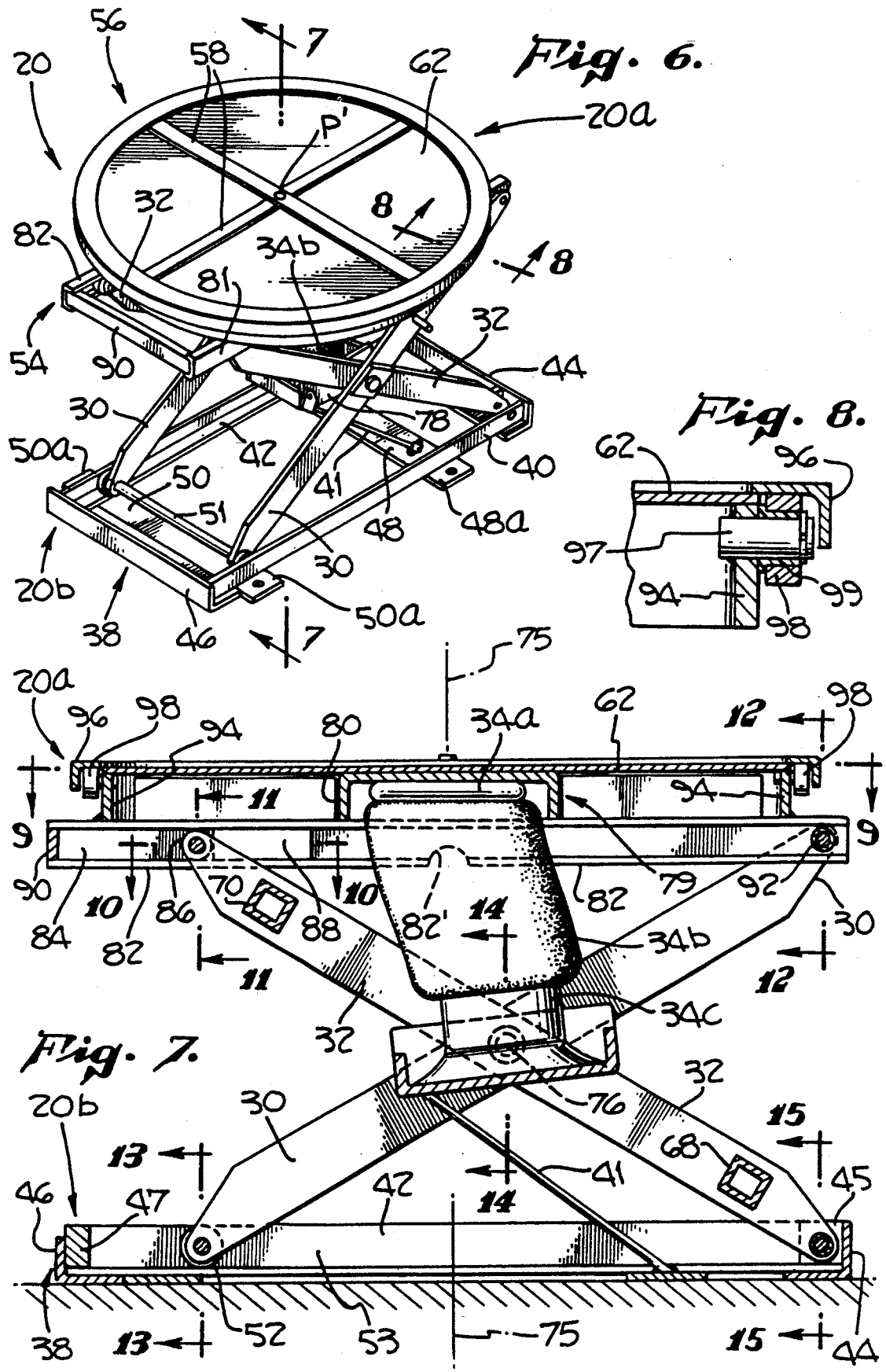

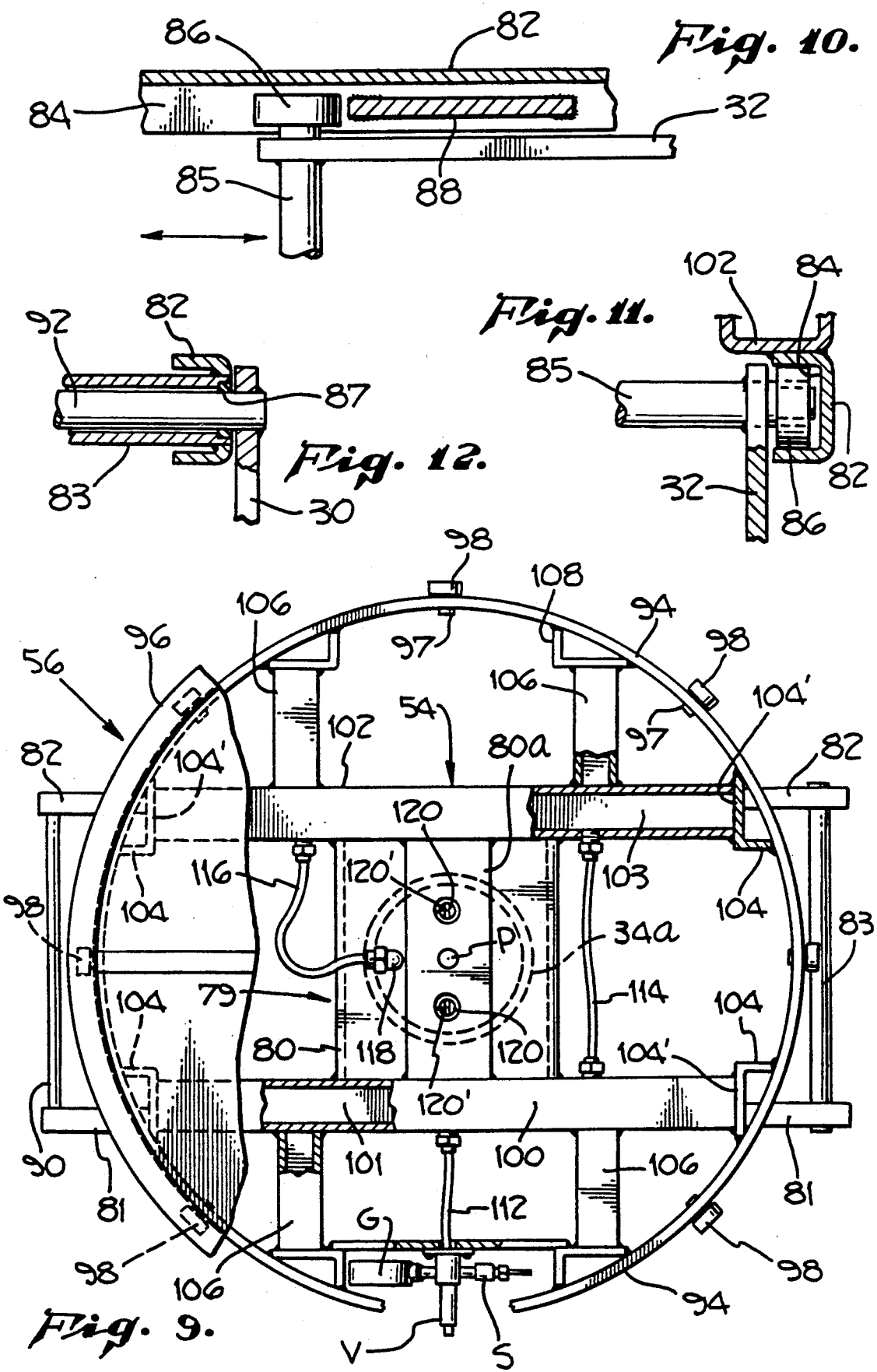

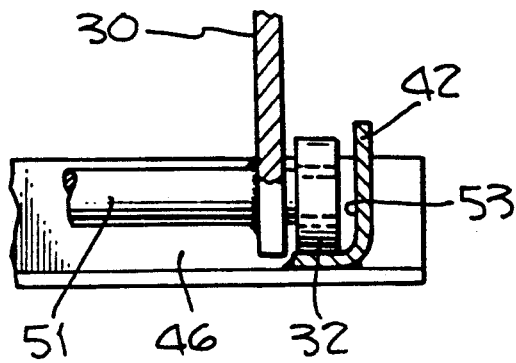
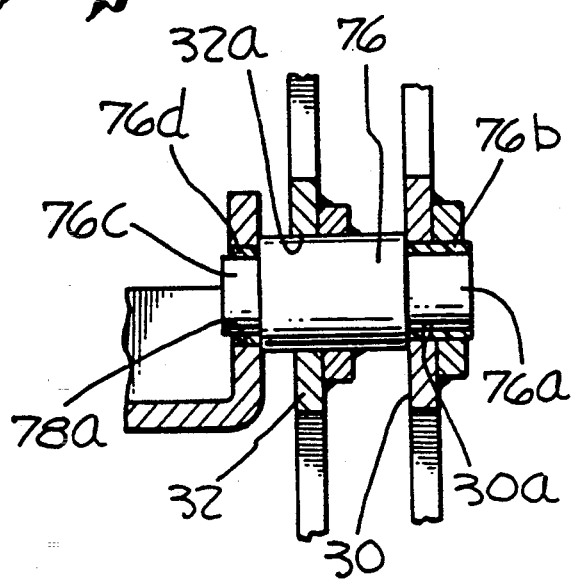
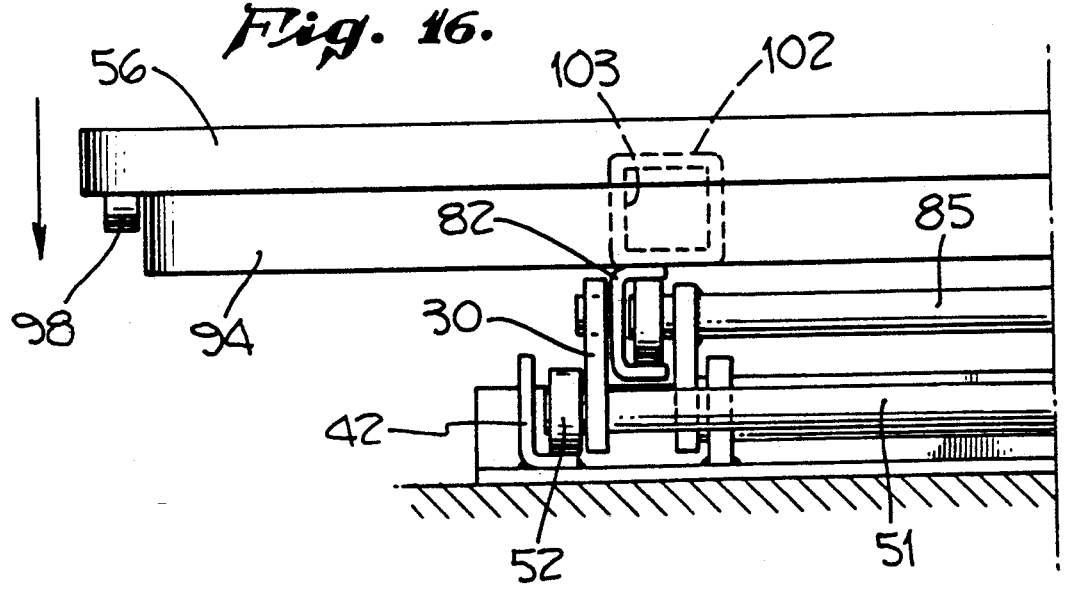
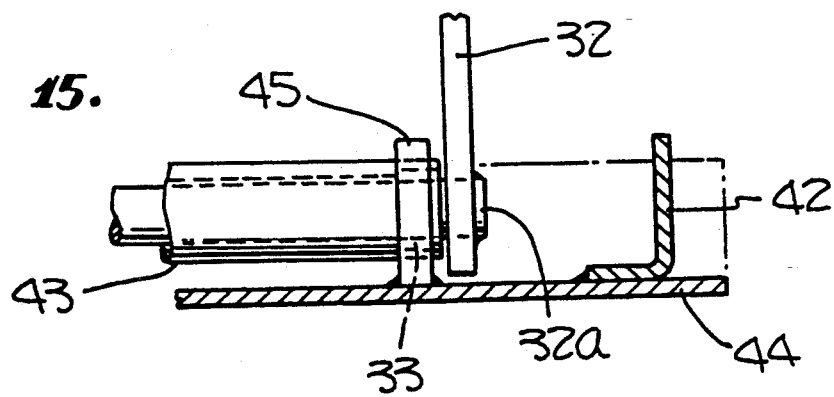

$$AF(Z) = \rho A \delta Z \cdot g$$

$$\frac{\delta F}{\delta Z} = \rho A g = \frac{W}{h} = \text{CONST.}$$

$\rho$ = DENSITY OF LOAD MATERIAL
$A$ = AREA COVERED BY LOAD
$g$ = GRAVITATIONAL ACCELERATION
$W$ = MAXIMUM LOAD WEIGHT
$h$ = HEIGHT OF MAXIMUM LOAD

SELF-ADJUSTING PNEUMATIC LOAD ELEVATOR

BACKGROUND OF THE INVENTION

1. Field of the Invention

The present invention relates to load elevators for use in loading and unloading a number of packages or objects, and more specifically, to load elevators and methods of using them that can maintain the top of a changing load at a convenient predetermined height.

2. Description of Related Art

In the handling of a number of packages or objects, a common task is to manually transfer them between an elevated table, conveyor, etc. and a pallet resting on the floor. While the table or conveyor remains at a fixed height, the top of the load on the pallet, where the next box or object is to be loaded or removed, usually is at a different height which varies as the packages, etc. are piled on or removed from the pallet. This difference in height, and the changes in this difference during loading or unloading of the packages, can be fatiguing for the person doing the moving. Therefore, elevators have been developed for raising the pallet from the floor to a more convenient height and even for automatically adjusting the height of the pallet as the load increases or decreases so the preferred height of the top of the load is maintained.

For example, Cox's U.S. Pat. No. 4,764,075 shows a scissor elevator supported by helical metal springs that maintain the top of a load of boxes or the like at a preset height P above the floor (e.g. 0.975 m) as boxes are added or removed (Cox, FIG. 6, upper diagram). Once the desired preset height P, the maximum load height h and maximum load weight W, and the height S of the fully compressed springs are given, only the spring constant k (or the value of the spring capacity $C=k \cdot S$) needs to be determined. Because the maximum load height h and maximum weight W will vary from application to application, such a device usually needs to be purchased with a number of sets of springs and a change in application requires the consulting of a spring table and inconvenient changing of springs. That is, the means for adjusting the elevator for changes in the maximum load weight or changes in the density of the loaded objects is crudely quantized into cumbersome changes of the elevator springs rather than being continuously variable. Also, it is not practical to make such adjustment, i.e. the change of springs, while the elevator is under load.

While theoretically the spring constant k (or spring capacity C) of Cox's device might be determined by the user experimentally for a given maximum load height h and maximum weight W, in practice it is impractical to switch springs with a load in place. Therefore, Cox provides a formula or table for the user to follow to estimate the needed spring capacity C from the maximum load height h and maximum weight W. The formula assumes that the load is of approximately uniform density from box to box, in which case the springs should ideally be linear springs. The formula also assumes that, if there is no load on the pallet, the selected spring should produce only a little preloaded force to support the empty elevator mechanism and pallet.

In contrast, French Patent No. 1,473,991 (Fogautolube S. A.) shows a scissor-type pneumatic jack powered by a double-chamber bellows inserted between a base plate 2 and an intermediate plate or cup carried by the pivot pin of the scissors. However, this device appears to have been designed as a simple jack for autos and therefore does not discuss how to automatically keep loads of different heights at a preset distance from the floor for loading and unloading. Because the shape of a bellows changes significantly when substantially inflated or compressed, such a device may be less linear than a spring. However, substantial linearity is not required for a lifting jack because one simply inflates the bellows until the desired height is reached.

Similarly, French Patent No. 1,282,755 (Dittberner) shows a scissor-type pneumatic jack powered by a single-chamber bellows inserted between a base plate and an intermediate plate or cup carried by the pivot pin of the scissors.

German Patent No. 3,801,491 (Hahn) shows a scissor-type pneumatic jack powered by a single-chamber bellows inserted between plates carried by the scissor legs. This device is a loader/receiver for shelf system, and therefore it features a way of tilting the upper platform.

U.S. Pat. No. 3,174,722 (Alm) also is a jack for lifting vehicles. It has a scissor-type pneumatic lifter powered by a bellows inserted between upper and lower plates which ride in tracks on the scissor legs. U.S. Pat. No. 4,921,074 (Ochs) shows a narrow scissor-type pneumatic lifter attachment that can be fitted on each track of existing vehicle lifting platforms (See FIG. 1). The bellows is between a base and a top platform, but to one side of the scissor support (FIG. 2) so that the device is not wider than a vehicle track.

U.S. Pat. No. 4,688,760 (Garman) has a scissor-type pneumatic lifter powered by a multi-chamber bellows inserted between an upper platform and the base. Since the upper platform has a "backrest assembly 60" it appears to be designed as a lifter chair or bed. Its novel features are directed an improved linkage for the scissor legs which stabilize the top platform.

Other jack patents simply show various geometries for scissor-type automobile-lifting pneumatic jacks. For example, U.S. Pat. No. 2,070,960 (Phillips) is a compact lift having a multi-chamber bellows surrounded by scissors on four sides. U.S. Pat. No. 2,610,824 (Grier) has a plurality of bellows or air bags, each bag having a metal frame with holes 34 to accommodate the pivot pin of a corresponding scissor or "lazy tong" stabilizer. U.S. Pat. No. 3,379,411 (Vanderjagt) uses an air hose folded on itself several times as the bellows, and a lifting arm (claim 3) or plate (claim 4) is connected to one end of a base 22. U.S. Pat. No. 2,001,744 (Patterson) shows front and side scissor stabilizers around a plurality of bellows.

While the bellows devices of the prior art have the advantage that their elasticity or springiness can be increased or decreased by respectively raising or lowering the air pressure in the bellows, they have the disadvantage of being generally less linear than the sets of helical springs of Cox over a wide range of potential loads. Moreover, when a bellows is inflated or deflated with high pressure air, it may suddenly elongate or contract. If such a bellows were used as an actuator in a load elevator, such sudden elongation or contraction could translate into sudden motion of the elevator that could injure the person it.

Therefore, it is an object of the present invention to provide a self-adjusting load elevator that uses a bellows as the height adjusting device yet overcomes these disadvantages. It is a further object of the invention to provide such a load elevator with a safety mechanism for preventing sudden or jerky motion that may be dangerous to the user. A further object is to provide improved methods of using such devices that make it easy for the user to adjust the load elevator for different maximum loads.

SUMMARY OF THE INVENTION

A self-adjusting load elevator is provided having a base, a horizontal load platform, a vertically expandable scissors linkage mechanically coupled between the load platform and the base, and an air actuator chamber. The air actuator chamber is formed of a compressible bellows and a fixed volume reservoir. The bellows is compressible between specified maximum and minimum bellows heights which correspondingly determine substantially different maximum and minimum bellows volumes and is mechanically coupled between the scissors linkage and the load platform. The air reservoir is air coupled to the bellows and has a fixed volume that is substantial in comparison with the difference between the maximum and minimum bellows volumes. A normally closed air inlet/outlet valve is air coupled to the fixed reservoir of the air actuator. The air couplings between the inlet/outlet valve and the air actuator, and between the reservoir and the bellows, can be thin tubes to damp the elevator's motion. The invention also includes a method of operating such a load elevator.

BRIEF DESCRIPTION OF THE DRAWINGS

FIG. 1 is a front view of a load elevator according to the invention when carrying a load substantially more than needed to fully compress it.

FIG. 2 is a front view of the load elevator of FIG. 1 when carrying a load just sufficient to fully compress it.

FIG. 3 is a front view of the load elevator of FIG. 1 when carrying a load somewhat less than sufficient to fully compress it.

FIG. 4 is a front view of the load elevator of FIG. 1 when carrying a minimum load of just a light pallet for supporting loads.

FIG. 6 is a perspective view of the load elevator of FIG. 1 at its highest position and without a load.

FIG. 7 is a cross-sectional view of the load elevator of FIG. 6 along the line 7—7.

FIG. 8 is a cross-sectional view of a portion of a rotator ring assembly of the load elevator of FIG. 6 along the line 8—8.

FIG. 9 is a partially cut away top plan view of the load elevator of FIG. 6.

FIG. 10 is a cross-sectional view of an upper scissor track portion of the load elevator of FIG. 7 along the line 10—10.

FIG. 11 is a cross-sectional view of an upper scissor track portion of the load elevator of FIG. 7 along the line 11—11.

FIG. 12 is a cross-sectional view of an upper scissor end portion of the load elevator of FIG. 7 along the line 12—12.

FIG. 13 is a cross-sectional view of a lower scissor track portion of the load elevator of FIG. 7 along the line 13—13.

FIG. 14 is a cross-sectional view of a central scissor portion of the load elevator of FIG. 7 along the line 14—14.

FIG. 15 is a cross-sectional view of a lower scissor end portion of the load elevator of FIG. 7 along the line 15—15.

FIG. 16 is a cross-sectional view of a rear portion of the compressed load elevator of FIG. 1 along the line 16—16.

DETAILED DESCRIPTION

Figure 5A:
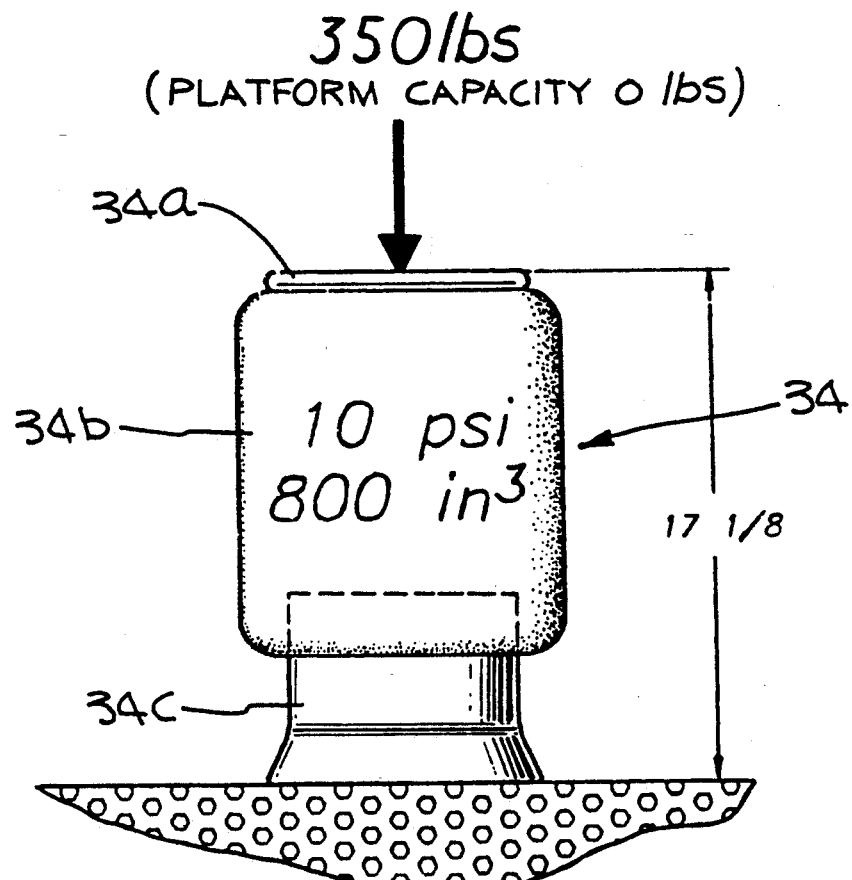
FIG. 5A is a diagram showing an expanded bellows filled with a quantity of air to a gage pressure of 10 psi.

A front view of a load elevator 20 according to the invention on a support surface 22 is shown in FIGS. 1-4 in various stages of use while unloading a load 26 of boxes 28 of similar density from a pallet 24. The major load-bearing components of elevator 20 are formed of strong material, such as steel, firmly joined together by welding, screws, bolts, or the like. The front and rear of load elevator 20 are each provided with a hinged pair of outboard and inboard scissor legs 30 and 32 (FIG. 4) which are opened and closed by a resilient air bellows 34 containing a predetermined fixed amount of air. This enables a top portion or load platform 20a (FIG. 3) of load elevator 20 to be raised or lowered with respect to a bottom or base portion 20b. In FIG. 1 the number of boxes is greater than necessary to fully compress elevator 20, so it is at its minimum height $H_{MIN}$. As boxes 28 are individually removed, at some point as shown in FIG. 2, the load is only just enough to fully compress elevator 20 to $H_{MIN}$. Then, as further boxes are removed, elevator 20 begins to rise as shown in FIG. 3. When finally there is no load except the pallet (which is relatively light), elevator 20 reaches a predetermined maximum height $H_{MAX}$ determined by a stop on the elevator mechanism. In this manner, the top of load elevator 20 automatically adjusts according to the load to maintain the top of the load at a convenient height for the user.

Figure 19:
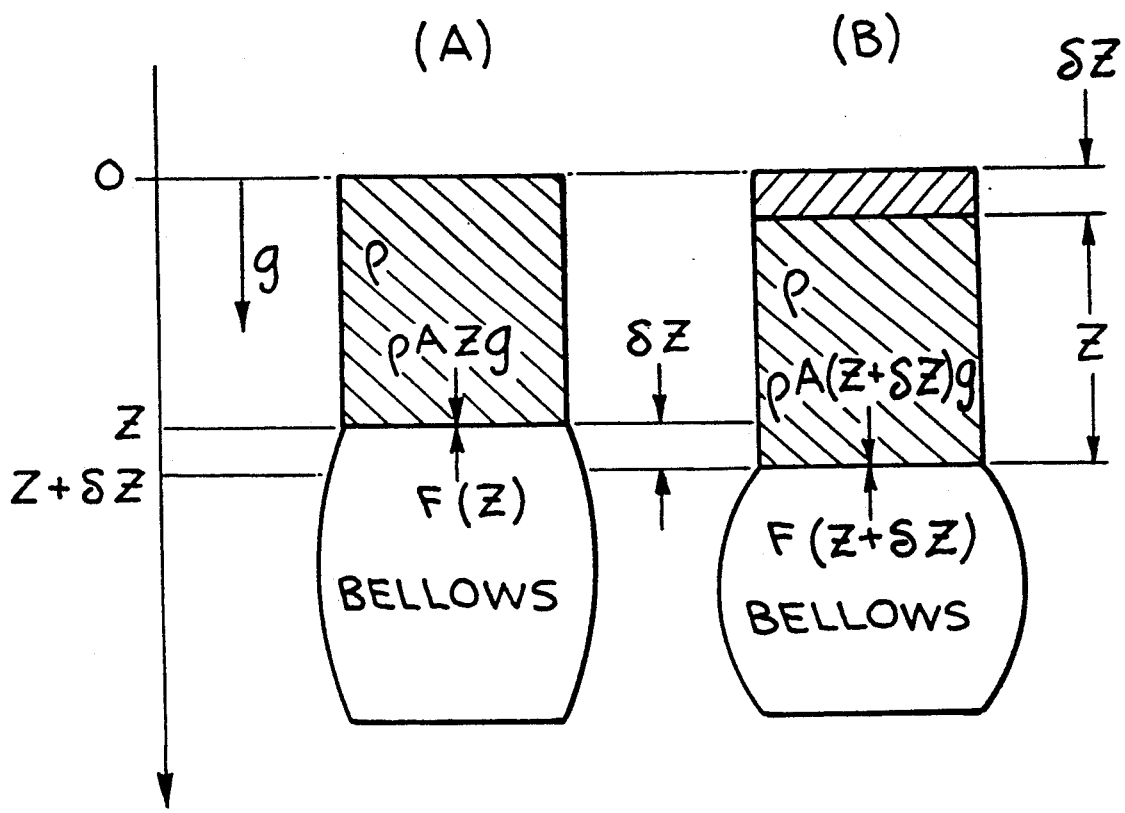
FIG. 19 is a diagram of the opposing forces produced by gravity and a self-adjusting bellows on a load at (A) which is incrementally increased at (B).

As shown in FIG. 19, a simplified version of elevator 20 with a bellows between a lift platform and a base can be modeled as a one-dimensional system in the vertical (z) direction that produces an upward force F(z). The load material has a weight per unit height of W/h, where W is the weight of a load of height h. Suppose the amount of load is increased by adding a thin layer of thickness $\delta z$ of weight $(W/h) \delta z$. To maintain the top of the load at the same height, the bellows force F(z) must increase over the distance $\delta z$ by an equal amount. That is:

$$\delta F = (W/h) \delta z \qquad \text{Eq. 1}$$

$$\delta F / \delta z = W/h = \text{const.} \qquad \text{Eq. 2}$$

For small $\delta z$, $\delta F/\delta z$ approaches the slope df(z)/dz, so that the bellows force F(z) must have the slope:

$$df/dz = W/h = \text{const.} \qquad \text{Eq. 3}$$

where W is the weight of a load of height h.

In other words, if the load is of uniform density, the increase of the bellows force per unit height must be a constant equal to the weight of the load per unit height. If elevator 20 is to be self-adjusting for loads of uniform density, its force vs. height curves must be approximately straight, or at least have substantial straight portions over which the height adjustment can take place.

For example, bellows 34 can be a commercially available airstroke actuator, such as model 1T15S-6 sold by Firestone Industrial Products Co. of Noblesville, Ind. As shown in FIG. 5A, in this type of bellows, there is a top attachment plate 34a, a main body 34b made of reinforced rubberized fabric, and, at the bottom, a metal piston 34c which intrudes into the main body 34b when bellows 34 is compressed.

As shown in FIG. 5A, when an IT15S-6 bellows is expanded to a height of 17.125 inches by an air pressure of 10 psi (all references to "pressure" are to gage pressure), the volume of air in the bellows will be about 800 cu. in., and the upward force produced by the bellows on plate 34a will only support a weight of 350 lbs. As described in more detail below, in elevator 20 of FIG. 4 the bellows 34 is mounted so that effectively there is about a 1:2 ratio between the lever arm for bellows 34 and the lever arm for load platform 20a. Therefore, the 350 lbs of force produced by bellows 34 will just support the weight of load platform 20a of elevator 20, which weighs about 175 lbs.

Figure 5B:
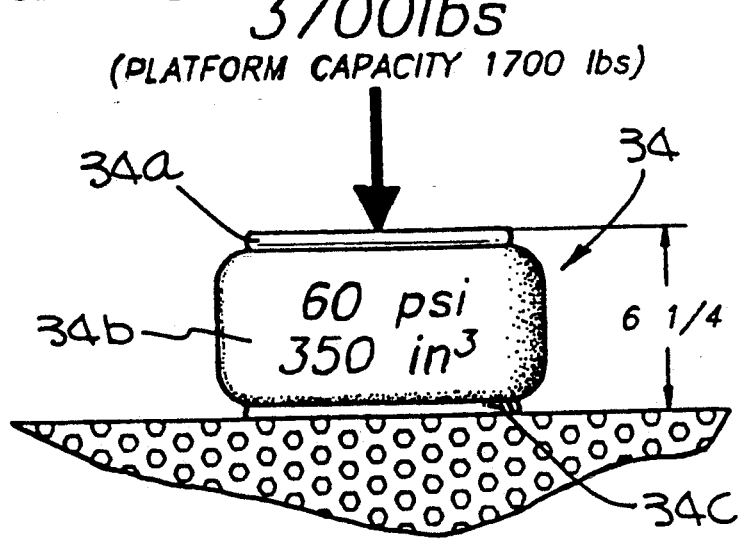
FIG. 5B is a diagram showing the bellows actuator of FIG. 5A with the same quantity of captive air when greatly compressed, the gage pressure of the captive air having risen to 60 psi.

If the quantity of air in bellows 34 is kept constant and an external load put on elevator 20, bellows 34 will be compressed, increasing the air pressure in bellows 34, and therefore the upward force produced by bellows 34. Such compression of the air in the bellows is polytropic, that is $pV^n$ is constant, where p is pressure, V is volume, and n is some constant. The compression normally proceeds until the increased upward force produced by bellows 34 on plate 34a, as halved by the 1:2 lever arm ratio when transferred to load platform 20a, will support the combined weight of the elevator's load platform 20a plus the external load. As shown in FIG. 5B, if the initial air pressure in FIG. 5A was 10 psi, an external load of about 1700 lbs will compress bellows 34 to a height of 6.25 inches and raise the pressure of the captive air to 60 psi, which produces an upward force of about 3700 lbs.

As will be described in more detail below, elevator 20 includes mechanical upper and lower stop mechanisms, respectively activated at predetermined maximum $H_{MAX}$ and minimum $H_{MIN}$ elevator heights for keeping bellows 34 operating within practical maximum and minimum heights. For example, an IT15S-6 bellows is preferably operated with a maximum height of about 17.125 inches and a minimum height of about 6.25 inches. For many general uses the upper and lower stop mechanisms of elevator 20 of FIG. 1 could then advantageously be set for a maximum elevator height $H_{MAX}$ of about 30 inches and a minimum or collapsed elevator height $H_{MIN}$ of about 8.25 inches.

Therefore, the maximum balanced external load capacity $L_{BMAX}$ of load elevator 20 can be defined as the load which compresses elevator 20 to the predetermined minimum height $H_{MIN}$; loads heavier than $L_{BMAX}$ can be put on elevator 20 but will not reduce its height to less than $H_{MIN}$. As shown in FIG. 1, generally the maximum external load $L_{MAX}$ on elevator 20 will be greater than the maximum balanced external load capacity $L_{BMAX}$.

Figure 5C:
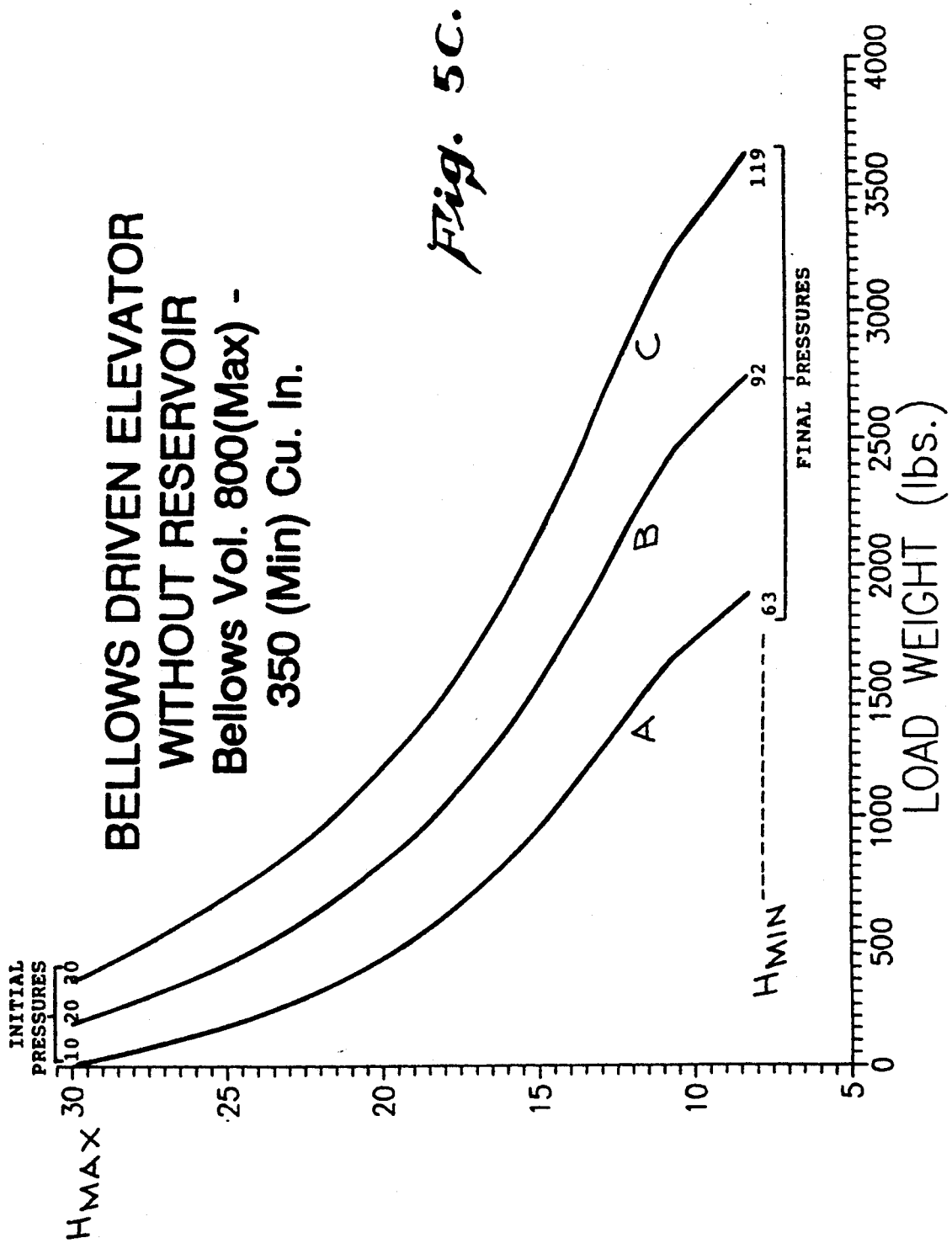
FIG. 5C is a hypothetical graph of the height of a load elevator similar in geometry to that of FIG. 1 as a function of load on the elevator, if actuated by the bellows of FIGS. 5A and 5B without an external reservoir, for various fixed quantities of bellows air as determined by the initial bellows air pressure at the elevator's highest position.

FIG. 5C shows the resulting relationship between external load weight and elevator height of such a load elevator 20 for various initial pressures of the expanded bellows 34. For example, to generate curve A, all external load is removed from load elevator 20 and bellows 34 inflated to an air pressure of 10 PSI, after which the air inlet is closed. With no external load, the 10 PSI pressure expands bellows 34, raising elevator 20 to a maximum height $H_{MAX}$, for example about 30 inches, as limited by a mechanical stop on the scissor mechanism. Then, as the external load on elevator 20 is increased from 0 to about 1700 lbs (see FIGS. 4, 3, and 2), elevator 20 automatically lowers until it is compressed to its minimum height $H_{MIN}$, for example about 8.25 inches.

Comparing curves B and C (respective initial pressures 20 and 30 psi) with curve A (initial pressure 10 psi), we can see that increasing the initial air pressure in the expanded bellows 34 from 10 psi to 20 or 30 psi decreases elevator 20's downward travel for a given load. Increasing the initial pressure (the amount of captive air in bellows 34) also increases elevator 20's maximum external load capacity at the cost of making elevator's response more "stiff."

Unfortunately, the curves of FIG. 5C also show that the use of a bellows as the resilient means in the load elevator introduces a number of potential problems. Firstly, the curves for such a captive air bellows system are substantially nonlinear. For example, in each of curves A, B, and C, when the height of elevator 20 is near $H_{MAX}$, an additional pound of external load will decrease the elevator height substantially more than will be the case when the elevator height is near $H_{MIN}$. That is, elevator 20 will become noticeably more stiff as the external load on it is increased. When boxes of about the same density are successively loaded on elevator 20, as in FIGS. 1–4, the top of load elevator 20 will not properly maintain the top of the load at a convenient predetermined height for the user. Therefore, some way needs to be found to straighten out the response curves.

A second problem is that, for maximum loads less than 2,000 lbs, it may be difficult to get load elevator 20 to move all the way down to $H_{MIN}$. Even curve A at the low initial pressure of 10 psi does not reach $H_{MIN}$ for an external load of 1,500 lbs. An airstroke actuator such as the model 1T15S-6 requires a minimum internal pressure of about 10 psi for operation so that it will properly compress. Therefore, to accommodate maximum loads less than 2,000 lbs some way other than reducing the initial pressure below 10 psi must be found to reduce the stiffness of bellows 34.

Thirdly, an airstroke actuator bellows, such the model 1T15S-6, is capable of very sudden, powerful movement that could be dangerous to the operator. For example, suppose elevator 20 includes an exhaust valve by which the user can reduce the air pressure in bellows 34. Opening the valve too wide might cause a sudden lurch of bellows 34 downward, injuring the user. Similarly, if bellows 34 is filled with air from a high pressure shop line (pressures 100-150 psi), it might endanger the user by expanding too suddenly. Also, while adding or removing a portion or all of the external load should cause elevator 20 to adjust its height, it will be inconvenient and potentially dangerous for the user if the adjusting movement causes oscillation of load platform 20a of elevator 20.

Finally, a fully extended bellows can produce an undesirable preloaded force. For example, at FIG. 5C, in curve A (initial pressure 10 psi) at elevator height $H_{MAX}=30$ inches, because the fully extended bellows only produces a preloaded force just sufficient to support the weight of the elevator's load platform 20a, the external load capacity is zero. This means that if any external load is put on load platform 20a, the elevator will immediately reduce its height accordingly. But in curve B (initial pressure 20 psi) at elevator height $H_{MAX}=30$ inches, the fully extended bellows 34 produces a preloaded force on the elevator's load platform 20a of about 200 lbs more than needed to support the weight of load platform 20a. Elevator 20 will not reduce its height until the external load on platform 20a exceeds 200 lbs. And in curve C, the minimum external load to move the load elevator from its maximum height is about 400 lbs. Therefore, there should be some way to reduce or compensate for unwanted preload.

Figure 5D:
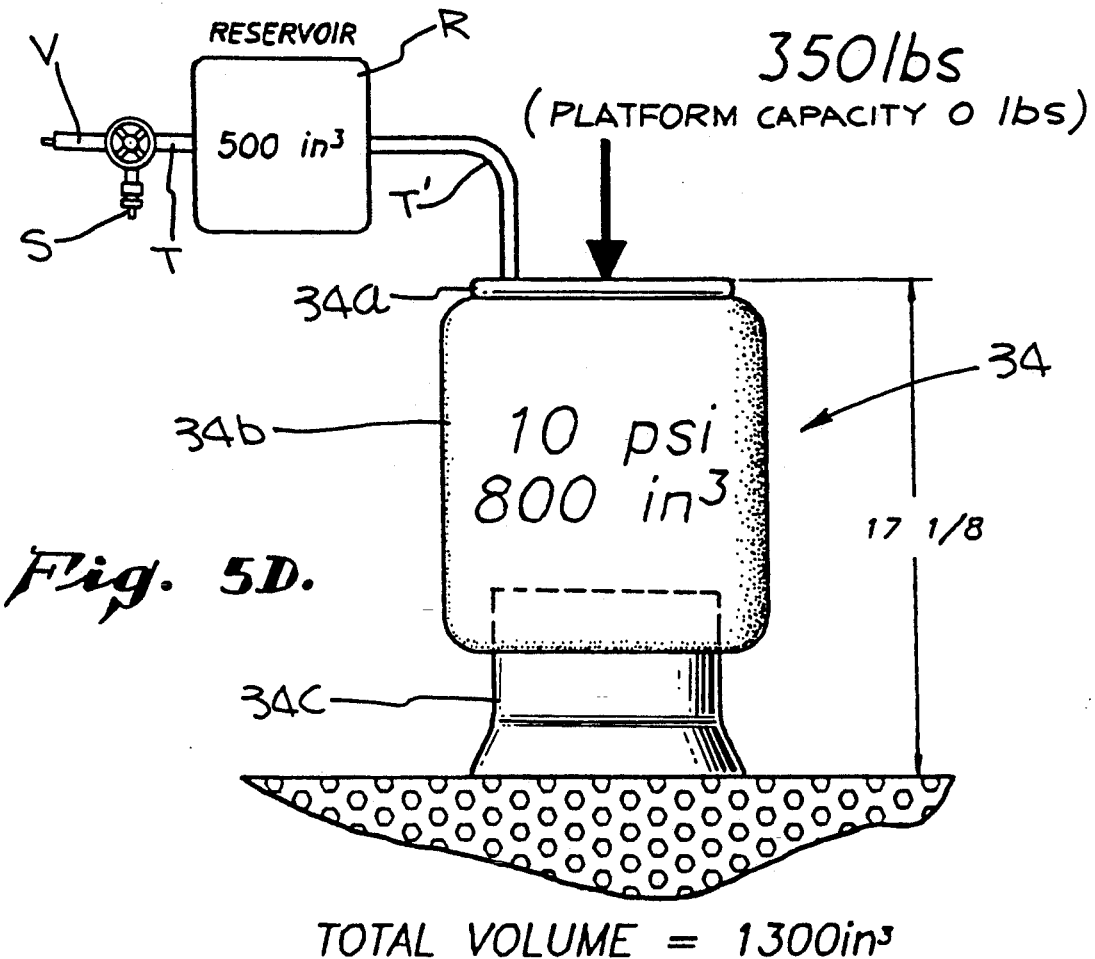
FIG. 5D is a diagram showing an expanded bellows actuator coupled for air passage to a reservoir, the bellows and reservoir together being filled with a quantity of air to gage pressure of 10 psi.
Figure 5E:
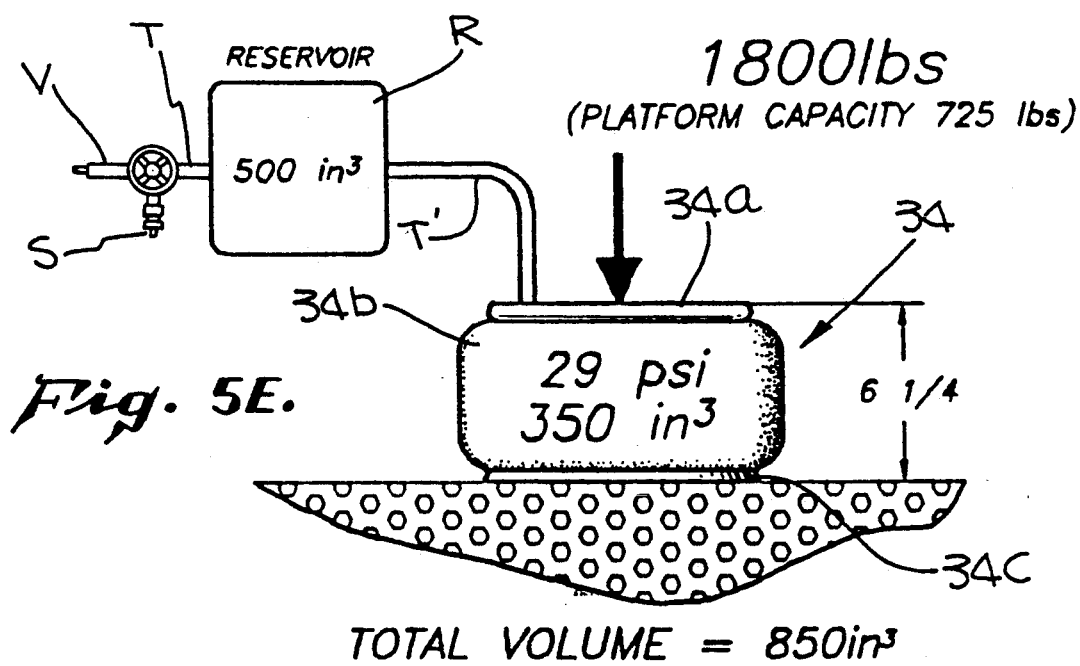
FIG. 5E is a diagram showing the bellows actuator and reservoir of FIG. 5D with the same quantity of captive air when the bellows is compressed to the same height as in FIG. 5B, the gage pressure of the air captive in the bellows and reservoir having risen to 29 psi.

The diagrams of FIGS. 5D and 5E show an improved construction of the bellows portion of elevator 20 designed to eliminate or compensate for these problems. To straighten the response curves of FIG. 5C, an air reservoir R of substantial fixed volume is air-coupled (coupled for air passage) to bellows 34. For example, suppose bellows 34 alone has a maximum volume of 800 cu. in. and a minimum volume of 350 cu. in. The 450 cu. maximum decrease in volume is about 56% of the maximum volume, which will greatly increase the pressure of the air captive in bellows 34. If reservoir R coupled to bellows 34 has a volume roughly comparable to the 450 cu. in. maximum decrease in bellows volume, the total volume of the air-coupled bellows and reservoir system will change less drastically when bellows height is reduced. This will moderate the increase in bellows air pressure as the load elevator is reduced in height.

Figure 5F:
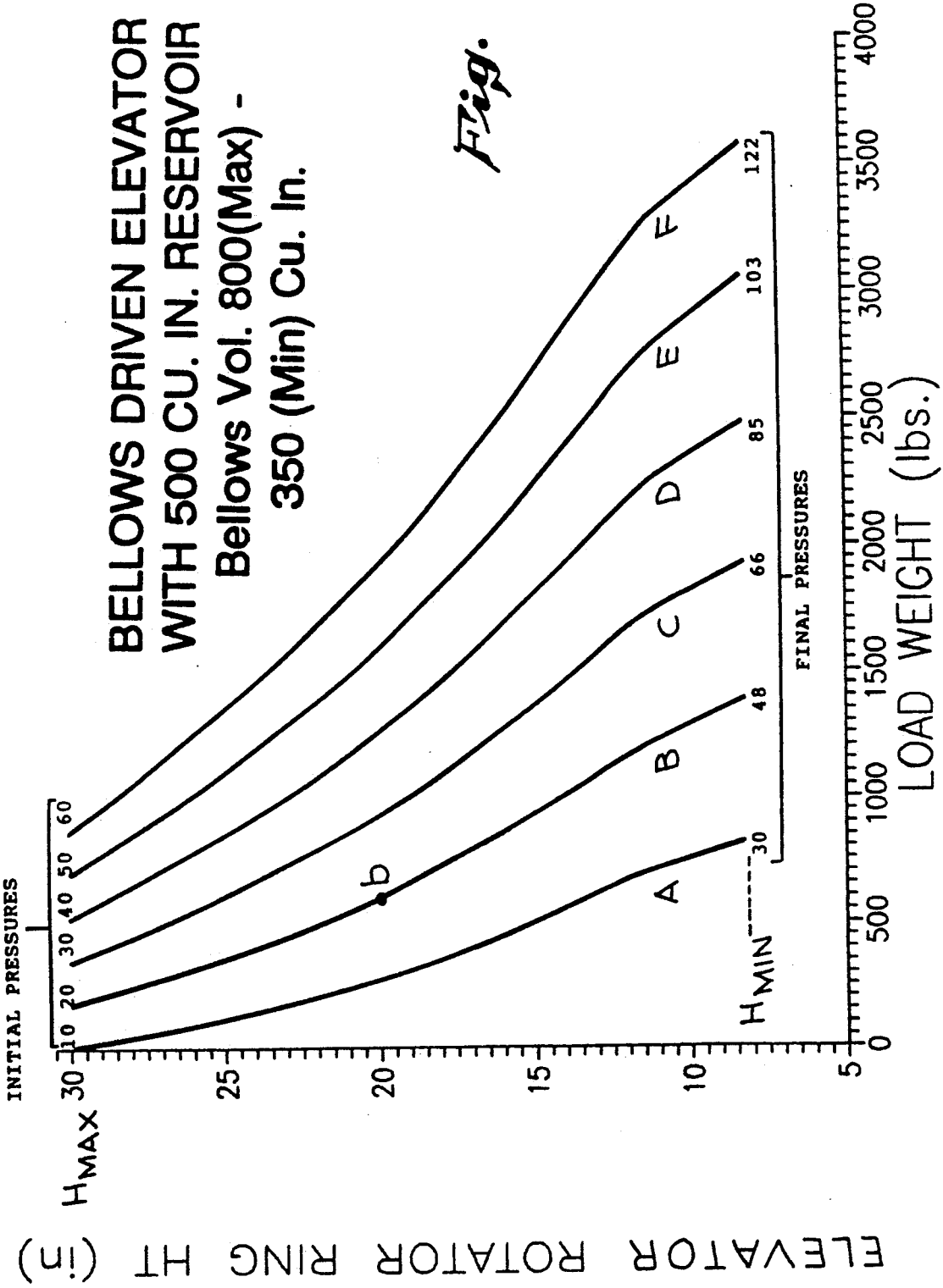
FIG. 5F is a graph of the height of the load elevator of FIG. 1 as a function of load on the elevator, when actuated by the air-coupled bellows and reservoir of FIGS. 5D and 5E, for various fixed quantities of air in the bellows and reservoir system as determined by the initial air pressure in the system at the elevator's highest position.

For example, as shown in FIG. 5D, if the fixed reservoir has a volume of 500 cu. in., the total volume of the fully expanded bellows and reservoir will be 1,300 cu. in. Then even when bellows 34 is compressed to its minimum volume of 350 cu. in., the total volume will only be reduced about 35% to 850 cu. in. As shown in FIGS. 5D-5F, the captive air in bellows 34 and reservoir R system increases from an initial pressure of 10 psi when bellows 34 is at 17.125" maximum height to 29 psi when bellows 34 is at 6.25" minimum height. In FIG. 5E the bellows pressure of 29 psi produces an upward force of 1,800 lbs. Taking into account the 1:2 ratio between the lever arm for bellows 34 and the lever arm for the load and the 175 lb weight of load platform 20a of elevator 20, the elevator can support an external load of about 725 lbs.

By comparison, when the same bellows 34 is used without a reservoir as in FIGS. 5A-5C, the captive air in bellows 34 more sharply increases to 60 psi when bellows 34 is at minimum height as shown in FIG. 5E, which pressure can support an external load of about 1,700 lbs.

The graph of FIG. 5F shows the height of the load elevator of FIG. 1 as a function of external load when actuated by the coupled bellows and reservoir of FIGS. 5D and 5E. The response curves A-C of this reservoir system are indeed straighter than corresponding curves A-C of FIG. 5C for a system without a reservoir. Therefore, when boxes of about the same density are loaded on elevator 20 as in FIGS. 1-4, load elevator 20 can more easily be operated to maintain the top of the load at a convenient height determined by the user.

As previously mentioned, to noticeably straighten the curves of FIG. 5C, air reservoir R should have a fixed volume which is substantial compared to the difference between the maximum and minimum volumes of bellows 34. Preferably the volume of reservoir R will be at least 60% of the difference in volume of bellows 34, and more preferably at least 85%. In the example of FIGS. 5D-5F excellent results are achieved when the volume of reservoir R (500 cu. in.) is about 110% of the difference (450 cu. in.) in volume of bellows 34.

Moreover, for a given initial pressure at maximum elevator height $H_{MAX}$, elevator 20 with a reservoir is less "stiff" than one without. That is, the height adjustment for a given increase in external load weight is more responsive. As shown in FIG. 5F, curve A (initial pressure=10 psi), the greater responsiveness enables the height of elevator 20 to adjust to minimum elevator height $H_{MIN}$ of about 6.25 inches even for maximum loads as small as about 800 lbs. To adjust elevator 20 for heavier maximum loads, the user merely inflates the system of bellows 34 and reservoir R to a higher initial pressure. For example, see FIG. 5F, where curves B-F are at initial pressures 20-60 psi.

If volume of reservoir R is too large compared to the difference in volume of bellows 34, when bellows 34 is compressed its internal pressure will not increase sufficiently to properly self-adjust the height of elevator 20. Therefore, preferably the volume of reservoir R will be no more than about 160% of the difference in volume of bellows 34, and more preferably no more than about 135%.

To prevent sudden movement of load elevator 20, bellows 34 can be inflated or bled only via a normally closed air valve V air-coupled to reservoir R. A first length of narrow tubing T of relatively small inside diameter couples valve V to reservoir R, and a second length T' of such narrow tubing couples reservoir R to bellows 34. For example, the narrow tubing T, T' can be 0.25 O.D. nylon tubing have a 0.040" wall of a suitable length.

Suppose elevator 20 is at its minimum height $H_{MIN}$ and the air in bellows 34 and reservoir is at a gage pressure of 0 psi (i.e., at ambient absolute pressure). Further suppose that a high pressure (100 psi) shop air line (not shown) is connected to the normally closed inlet of valve S including a quick connect stem so the valve in S opens wide. Narrow tubing T limits the rate at which air from the high pressure line can flow into reservoir R to raise reservoir R's pressure, and the narrow tubing T' between reservoir R and bellows 34 limits the rate at which higher pressure air from reservoir R can flow into bellows 34 to raise the bellows' pressure. Therefore, it takes at least a few seconds for elevator 20 to begin rising in response to the high pressure air at the inlet of valve S. Since even suddenly opening valve S to let in high pressure air cannot suddenly change the air pressure in bellows 34, there is no sudden upward movement of elevator 20.

Reservoir R and narrow tubing connections T, T' also prevent sudden loss of pressure in bellows 34. For example, suppose elevator 20 with reservoir R and bellows 34 is being operated with valve S closed (with the shop air line removed) as in FIG. 5F, on curve B (initial pressure 20 psi) at point b at a height of about 20 inches and an external load weight of about 600 lbs. The air in bellows 34 will be at an elevated pressure somewhere between 20 and 48 psi. If a purge valve V is opened wide, narrow tubing T limits the rate at which air can escape from reservoir R to lower reservoir R's pressure, and narrow tubing T' between reservoir R and bellows 34 limits the rate at which the higher pressure air in bellows 34 can flow into the lower pressure reservoir R to lower the bellows' pressure. Therefore, it takes at least a few seconds for elevator 20 to begin descending in response to the opening of purge valve V. Since even suddenly opening purge valve V to bleed the air cannot suddenly change the air pressure in bellows 34, there is no sudden downward movement of elevator 20.

This construction also has the advantage that if the narrow tubing T from valves S and V to reservoir R, or narrow tubing T' between the reservoir and bellows is broken or cut, or has a leaky coupling, the air pressure in bellows 34 will still fall gradually, preventing a sudden downward movement of elevator 20.

Finally, as regards the preloading problem, in practice it has been discovered that if elevator 20's accommodation to a particular load is not suitable, an adjustment can be easily made by decreasing or increasing the amount of air in bellows 34. For a decreasing adjustment, one merely needs to open air purge valve V to bellows 34. For an increasing adjustment, one merely needs a common source of pressurized air, such as a pressurized air line or tank, for coupling to the quick connect stem on inlet valve S. In other words, the use of a pressurized air bellows provides the user an additional degree of freedom for easily altering the maximum load capacity of elevator 20 and adjusting its height, which mitigates the preloading problem.

The construction and working of an elevator 20 according to the invention will now be described in more detail. As shown in the embodiment of FIG. 6, at both its front and rear, elevator 20 has a centrally hinged pair of outboard and inboard scissor legs 30 and 32. A rectangular base 38 is formed by front and rear L-shaped bottom structural angles 40, 42 and right and left L-shaped bottom end structural angles 44, 46, and is strengthened by right and left cross ties 48, 50. These base elements are suitably joined together, preferably by welding or bolts. Each end of cross ties 48, 50 can be provided with projecting tabs 48a, 50a for attaching elevator 20 to a mounting pad on a shop floor, or to any other suitable mount. As can be seen in more detail in FIG. 15, front and rear inboard scissor legs 32 are connected by welding to transverse rod 32a rotatably inserted in a lower connecting rod 43, which in turn is attached to bottom structural angle 44 by passage through and welding to holes in a pair of front and rear upright base tabs 45 welded to the upper face of structural angle 44. The right ends of inboard scissor legs 32 are rotatably joined to base 38 because rod 32a is rotatably inserted via a bushing 33 in connecting rod 43.

Even where not specifically illustrated, generally suitable bushings are provided at rotatable joints and attachments to reduce friction at points in elevator 20 structure where there is rotation about another part. For example, in FIGS. 7 and 14 each inboard scissor leg 32 carries at about leg 32's midpoint an outward-projecting pivot pin 76 on which is a friction-reducing bushing 76b press fit in a central hole 30a in a corresponding outboard scissor leg 30. GARLOCK brand bushings made by Garlock Bushings Inc. of Thorofare, N.J. provide excellent friction reduction and are self-lubricating on the inner surface. These have a steel sleeve which supports a bronze layer coated with a self-lubricating material, such as a tetrafluoroethylene and lead coating, as the friction-reducing surface.

The left ends of front and rear outboard scissor legs 30 are welded to a left lower rod 51 (FIGS. 6 and 13) which passes through holes in the legs 30. As shown in detail in FIG. 13, each end of rod 51 projects beyond the corresponding leg 30 to support a corresponding front or rear wheel 52 mounted for low-friction rotation by means of a bushing or bearing (not shown). Front and rear wheels 52 run along the bottom of corresponding L-shaped tracks 53 in front and rear bottom structural angles 40, 42. Thus, the bottom ends of the pair of outboard scissor legs 30 can easily move left and right in bottom structural angles 40, 42.

The top ends of outboard and inboard scissor legs 30, 32 are attached, in a manner to be described below, to support a rectangular top frame 54 (FIG. 6) so that the right ends of legs 30 are rotatably joined to frame 54 at the right and the left ends of legs 32 can easily move left and right in a horizontal track 84 (FIG. 7) in frame 54.

Top frame 54 in turn supports a rotatable rotator ring 56 (FIG. 6) adapted to carry a loaded pallet or other external load. Rotator ring 56 is formed of a ring-shaped structural angle 96 having a cross section shaped like an inverted-L. Ring-shaped structural angle 96 is strengthened by welding in place across it a crossed pair of bars 58, each of which also has a central pivot hole 60 (FIG. 17) in which is press fit a bushing P' for pivotal attachment to top frame 54 about an upward-projecting pivot pin P (FIGS. 9 and 17) rotatably inserted in bushing P'. A pallet or load placed on rotator ring 56 of load elevator 20 can thus be easily rotated. A thin circular cover plate 62, of plastic or metal, is provided below rotator ring 56 with a central attachment hole 60' to accommodate the projecting pivot pin P (see FIG. 17). Cover plate 62 helps prevent the user from inserting his or her fingers into the potentially dangerous mechanism below the plate and also keep out small objects which might fall into the mechanism from the pallet during use.

As shown in FIG. 7, the front and rear inboard scissor legs 32 are joined together for strength by welding in place bottom and top structural tubes 68 and 70. Each pair of scissor legs 30, 32 is centrally hinged. As can be seen in more detail in FIG. 14, each inboard scissor leg 32 has at its center a hole 32a, into which a large diameter (e.g. 2") metal pivot pin 76 is welded. An outer end 76a of the pin 76 is formed with a slightly reduced diameter and rotatably passes through a bushing 76b inserted in a central hole 30a in the corresponding outboard scissor leg 30.

Figure 17:
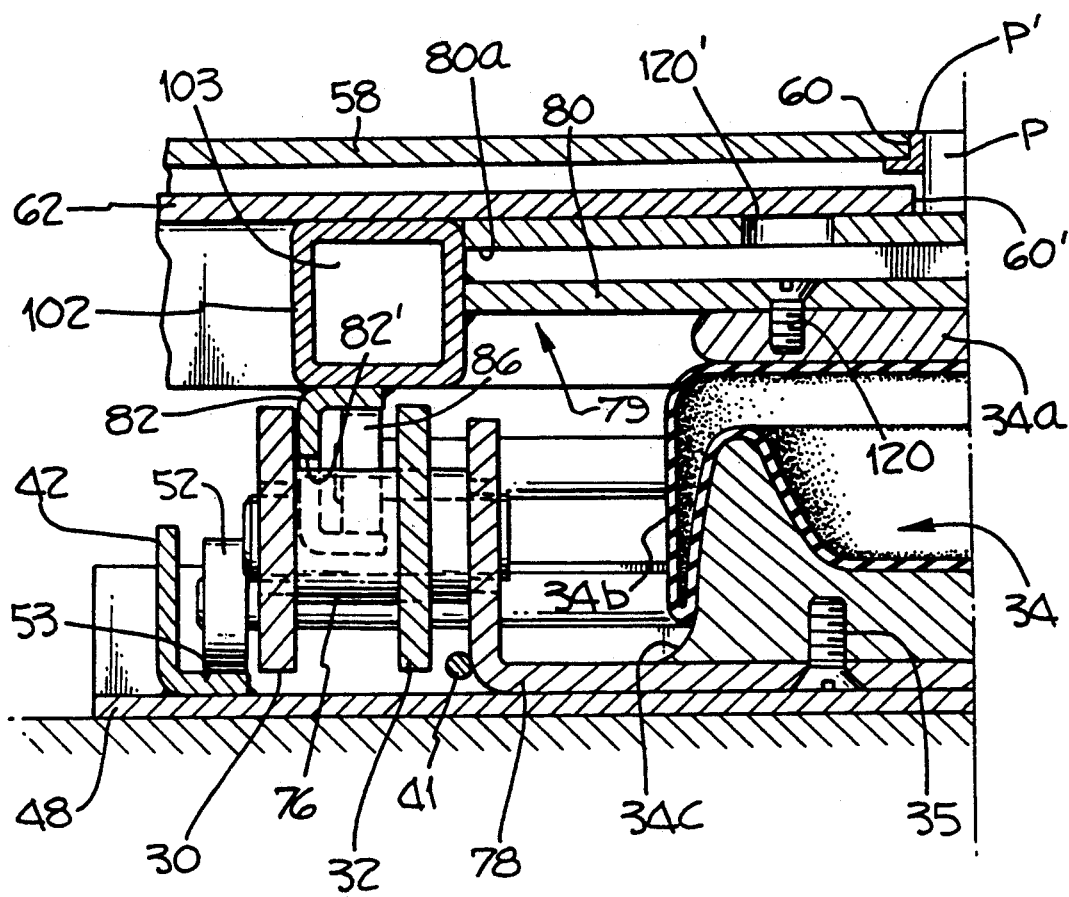
FIG. 17 is a cross-sectional view of a rear, right portion of the compressed load elevator of FIG. 1 along the line 17—17.
Figure 20:
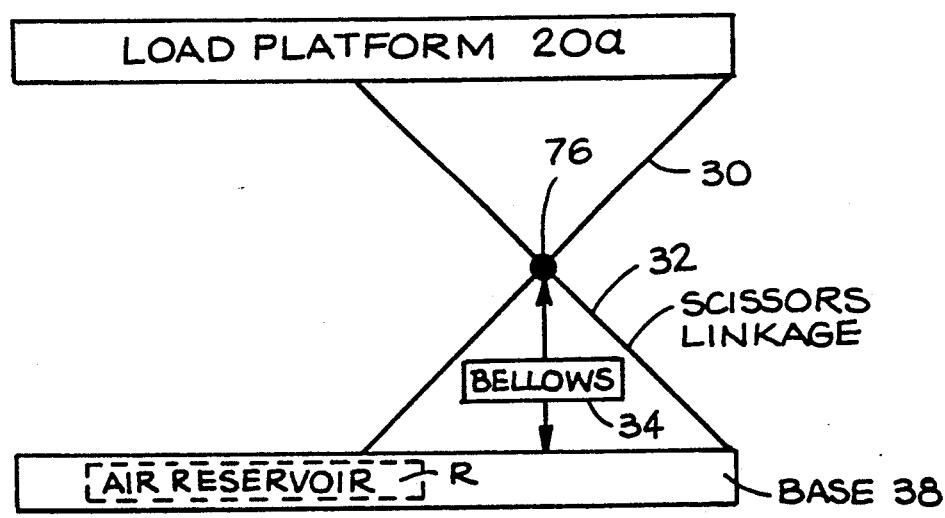
FIG. 20 is a diagram of an alternative embodiment showing the bellows mechanically coupled between the scissors linkage and the base, and the air reservoir disposed within the base.

The front and rear pairs of scissor legs 30, 32 of FIG. 7 cooperate to rotatably support between them a lower bellows cup 78 into which piston 34c of bellows 34 is mounted by bolts 35 (FIG. 17). As can be seen in more detail in FIG. 14, an inner end 76c of pivot pin 76 is formed with a slightly reduced diameter and rotatably passes through a bushing 76d inserted in a corresponding front or rear hole 78a in lower bellows cup 78.

As shown in FIGS. 6, 7 and 9, rectangular top frame 54 is formed of front and rear C-shaped top channels 81, 82 which are joined by a right-side hollow cylindrical top end bar 83 (FIG. 9) and a left top end bar 90. As illustrated in FIG. 12, a cylindrical rod 92 rotatably passes through bushings 87 near the ends of hollow cylindrical bar 83. The front and rear ends of hollow bar 83 are held by welds in corresponding holes in the right ends of front and rear C-shaped top channels 81, 82. The front and rear ends of rod 92 are held by welds in corresponding holes in the right ends of front and rear outboard scissor legs 30. Thus, front and rear outboard scissor legs 30 are rotatably joined to the right end of rectangular top frame 54.

As shown in more detail in FIG. 11, a left-side cylindrical rod 85 is welded in place in corresponding holes in the left ends of front and rear inboard scissor legs 32 to join them together. Each end of rod 85 projects beyond its corresponding leg 32 to support a corresponding front or rear wheel 86 mounted for low-friction rotation by means of a bushing or bearing (not shown). Front and rear wheels 86 run along bottom of corresponding C-shaped tracks 84 in front and rear channels 81, 82, restraining the channel 82 which is pushed upwards by bellows 34. Thus, the top ends of the pair of inboard scissor legs 32 can easily move left and right in top channels 81, 82.

The right ends of outboard and inboard scissor legs 30, 32 are respectively rotatably joined to the right ends of top frame 54 and base 38, while the left ends of the scissor legs 30, 32 are free to move right and left respectively in channels in the left ends of base 38 and top frame 54. This has the effect of keeping the top frame 54 above and parallel to the plane of base 38. As the scissors open (increase in angle with respect to the horizontal), top frame 54 is raised with respect to base 38. Since the top ends of scissor legs 32 move to the right to raise the elevator, the maximum height of the scissors can be set by welding stop blocks 88 in one or both of front and rear tracks 84 in front and rear top channels 81, 82 (see FIGS. 7 and 10.).

Closing the scissors lowers the top frame 54 onto base 38, at which time a semicircular cutaway 82' in each of top channels 81, 82 of top frame 54 provides clearance for pivot pin 76 (see also FIG. 17). Load elevator 20 includes a mechanical lower stop mechanism activated at the minimum $H_{MIN}$ elevator height. On the left, a pair of stop blocks 47 (FIG. 7) are welded in left bottom end bar 46 near the front and rear so that when inboard legs 32 have been lowered to horizontal, the left ends of channels 81, 82 rest on the stop blocks 47. On the right, front and rear upright base tabs 45 (FIG. 15) in right bottom end bar 44, are of sufficient height so that when outboard legs 30 have been lowered to horizontal, right top end bar 83 rests on the stop base tabs 45. Thus at the minimum height $H_{MIN}$ the weight of load platform 20a is transferred to the rectangular base 38 via stop blocks 47 and base tabs 45.

As shown in FIGS. 7-9, a horizontal support ring 94 is mounted around and carried by a parallel pair of front and rear horizontal hollow reservoir structural tubes 100, 102 (FIG. 9) as follows. An upper bellows cap 79 (FIG. 7) is formed by welding a downward-facing, wide C-shaped channel 80 at a recessed height between reservoir structural tubes 100, 102 (FIGS. 9 and 17). Channel 80 and structural tubes 100 and 102 then also form an H-shaped grid which is extended front and rear as shown in FIG. 9 by welding on pairs of front and rear horizontal arms 106. Arms 106 are then attached to support ring 94 by welding L-shaped support brackets 108 or the like between them.

As can be seen in FIG. 9, each open end of reservoir structural tubes 100, 102 is sealed by welding across it a plate portion 104' of an L-shaped support bracket 104, thereby respectively forming a pair of air reservoir chambers 101, 103, each having a fixed volume of about 250 cu. in. Each L-shaped bracket 104 is also welded at two edges to support ring 94 to provide additional support for the ring.

The center of the "H" is strengthened by also welding a downward-facing, narrow C-shaped horizontal channel 80a between front and rear reservoir structural tubes 100, 102. The top of narrow C-shaped channel 80a is flush with the top of structural tubes 100, 102 and has a pair of access holes 120' in it for bolts 120. The previously mentioned upward-projecting central pivot pin P is welded on the top of channel 80a (FIG. 17).

The H-shaped grid (FIG. 9) is mounted on rectangular top frame 54 by respectively welding reservoir structural tubes 100, 102 on top of front and rear C-shaped top channels 81, 82.

As previously mentioned, the bottom of bellows 34 (FIG. 7) is mounted in lower bellows cup 78 (see FIG. 17) which is carried by pivot pin 76. For example, bolts 35 are passed upward through corresponding holes in lower bellows cup 78 and screwed into mating threaded holes in bellows piston 34c. The top of bellows 34 is mounted in upper bellows cap 79 which is carried by top frame 54. For example, using access holes 120' in narrow channel 80a, bolts 120 are passed downward through corresponding holes in wide channel 80 and screwed into mating threaded holes in top attachment plate 34a of bellows 34.

Because pivot pin 76 is at the midpoint of both outboard and inboard legs 30, 32, it will always be midway in height between base 38 and top frame 54 (FIG. 7). Since bellows 34 is mounted between top frame 54 and pivot pin 76, whenever bellows 34 increases in height by an amount $\delta H$, it correspondingly increases the distance between top frame 54 and pivot pin 76 and the distance between pivot pin 76 and base 38 each by $\delta H$. This causes load platform 20a carried by top frame 54 to correspondingly rise 2·$\delta H$ above rectangular base 38. In other words, the scissors linkage formed by outboard and inboard legs 30, 32 is a lever mechanism coupling bellows 34 to load platform 28a with a ratio of 1:2 between the lever arm for bellows 34 and the lever arm for load platform 20a. This enables the bellows, which has a relatively short travel of about 11 inches, to change the height of load platform 20a by about 22 inches.

However, as can be seen in FIG. 7, this construction has the potential disadvantage that while upper bellows cap 79 is always centered about a vertical axis or centerline 75 of load elevator 20, lower bellows cup 78 moves off centerline 75 as elevator 20 rises. This is because lower bellows cup 78 is carried by pivot pin 76 which is moved off center to the right by legs 30, 32 as elevator 20 rises. For the embodiment of FIG. 7 this horizontal misalignment of lower bellows cup 78 from upper bellows cap 79 can be as much as about 3.5" and distorts the main body 34b of bellows 34. Since excessive distortion of main body 34b can interfere with proper operation of bellows 34, a stiff metal rod or link 41 (FIG. 6) is rotatably coupled between the front left corner of lower bellows cup 78 and an upward front projection on right cross tie 48 to tilt lower bellows cup 78 to reduce the distortion of bellows main body 34b. This tilting amounts to about 15° from the horizontal at its maximum, enabling lower cup 78 to be much further offset from upper cup 79 than would otherwise be acceptable. Preferably there is a second metal rod or link 41 rotatably coupled between the rear left corner of lower bellows cup 78 and an upward rear projection on right cross tie 48 so that a balanced pair of such rods 41 together tilt lower bellows cup 78 to reduce distortion of the bellows main body 34b.

A number of axle pins 97 (FIG. 9) are inserted for outward projection through matching holes distributed along support ring 94 (FIG. 8) and fixed in place by welding or the like. A support wheel 98 is rotatably mounted on the outer end of each axle pin 97 by means of a friction-reducing bushing or bearing 99. Wheel 98 can be formed of low friction material, such as ultra high molecular weight (UHMW) plastic, such as is available from Solidar Pacific Company of Portland, Oreg. As shown in FIG. 8, structural angle 96 of rotator ring 56 rides on wheels 98, enabling rotator ring 56 to be easily rotated even when it supports an external load.

As can be seen in FIGS. 8 and 17, the thin circular cover plate 62, of a diameter about the same as support ring 94 and having a central hole for pivot P, is laid over the H-shaped grid. Rotator ring 56 is then laid over support ring 94 so that ring-shaped structural angle 96 rides on wheels 98 (FIG. 8) and bushing P' in hole 60 of bars 58 rides on pivot P on channel 80a (see particularly FIG. 17).

The captive air system of elevator 20 includes the two fixed-volume air reservoirs 101, 103 built into the elevator's frame, each of about 250 cu. inches, coupled to bellows 34, which as a volume of 800 cu. in. at its maximum allowed height and a volume of 350 cu. in. at its minimum allowed height. The air inlet valve S and air purge valve V are coupled to the first air reservoir 101 by a short length (for example 6 in.) of narrow tubing 112 (FIG. 9), for example 0.25 O.D. nylon tubing having a 0.040 in. wall. First air reservoir 101 is coupled to the second air reservoir 103 by a short length (for example 13 in.) of narrow tubing 114. The second air reservoir 103 is coupled to an air inlet 118 in the bellows top plate 34a by a short length (for example 9 in.) of narrow tubing 116. Dividing the fixed volume air reservoir in this way makes it easier to incorporate the total fixed volume (500 cu. in.) in the frame and increases the damping provided by the fixed volume air reservoir.

A load elevator so constructed is normally initialized by inflation with air from a high pressure shop air line (not shown) to a specific initial pressure with no external load. This initial pressure causes the unloaded elevator to rise to its maximum height $H_{MAX}$. The preferred initial pressure is determined by the anticipated maximum external load and the desired "stiffness" of elevator 20's response. For example, a preferred way to use elevator 20 is to select the initial pressure so an external load of ⅔ of the maximum load will compress elevator 20 to its minimum height $H_{MIN}$. This enables the last ⅓ of the maximum load to be added at a convenient height on top of the other ⅔ of the load. From an initial maximum height $H_{MAX}$ (e.g., 30 inches) at no external load, elevator 20 will drop to a minimum height $H_{MIN}$ (e.g. 8.5 inches) for a balanced external load $L_{BMAX}$ of ⅔ of the maximum external load $L_{MAX}$. This amount of stiffness usually works well with typical loads such as boxes intended to be piled on the pallet in several layers to a height of about 45 inches.

However, there may be some very dense loads (e.g. a single, low-height layer of heavy metal objects), requiring less travel by elevator 20 as the external load is increased from 0 to ⅔ of the maximum load $L_{MAX}$. In such cases a greater initial pressure can be used so elevator 20's response is more stiff and there is less travel.

An air pressure gage G (FIG. 9) can optionally be provided on elevator 20 near the inlet for measuring the captive air pressure, or an external gage can be temporarily connected to the inlet when needed to measure air pressure, such as is done when measuring the air pressure of vehicle tires.

The initial pressure is typically set without an external load, in which case elevator 20 will be at its maximum height $H_{MAX}$. Once the initial pressure has been set, the shop air line is disconnected and valve S automatically closes so elevator 20 operates as a captive air system. During operation, the operating height can be reduced and elevator 20's response made less stiff by opening purge valve V to bleed out air. If the operating height needs to be raised and elevator 20's response made more stiff, the shop air line must be only temporarily reconnected to insert air.

Figure 18:
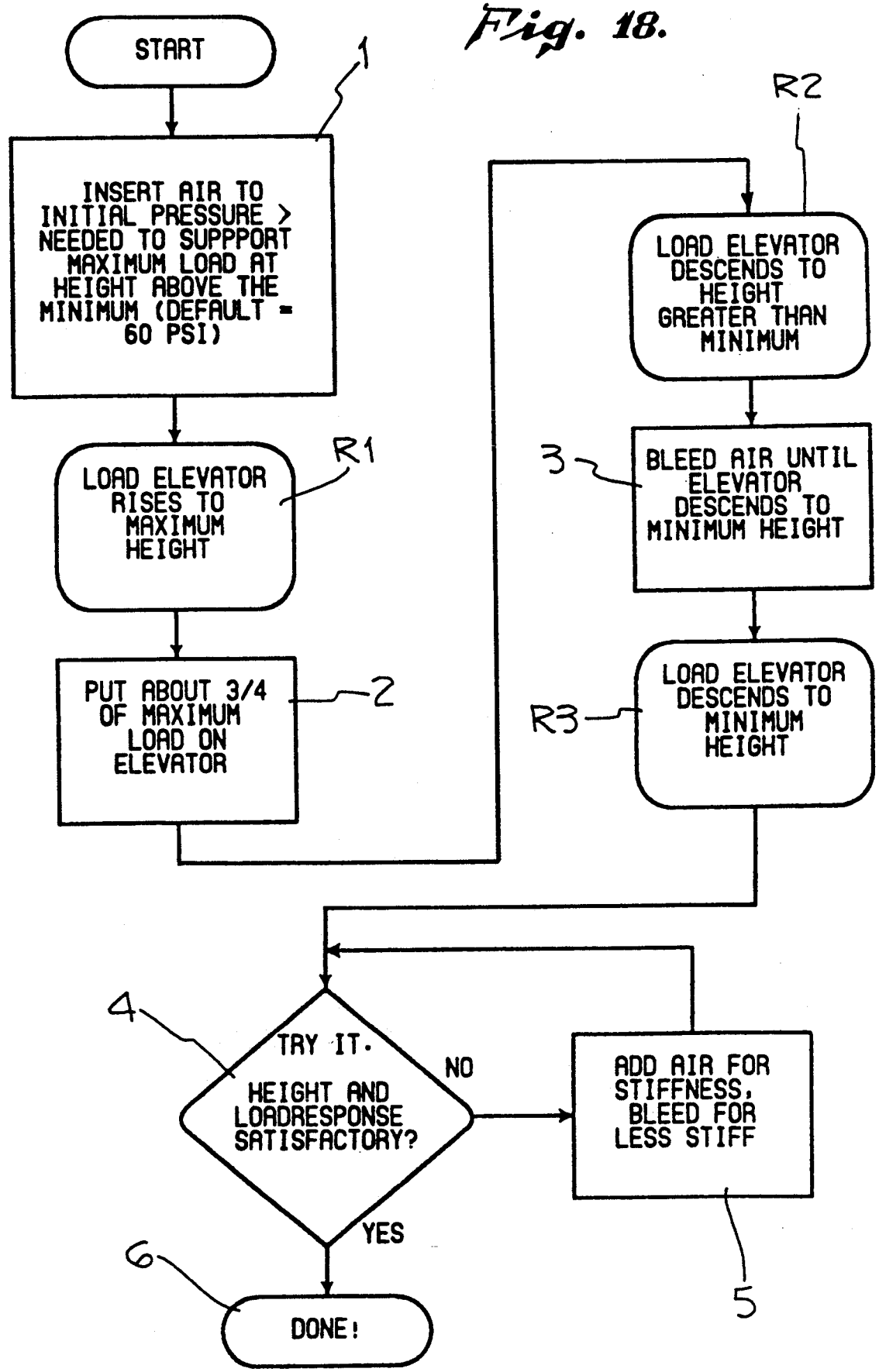
FIG. 18 is a flow diagram of a method according to the invention for initializing the load elevator for automatic height adjustment.

While for a given maximum load the recommended initial pressure can be determined from the graph of FIG. 5F, a much easier method of determining the recommended initial pressure by observation and air pressure adjustment is shown in the flowchart of FIG. 18. In the chart, steps performed by the operator are shown in rectangular or diamond-shaped boxes, and elevator 20's response is shown in boxes with rounded corners.

At Step 1, the user removes all external load from elevator 20 and air is inserted to an initial pressure greater than needed to support ⅔ of the anticipated maximum load. The default for this pressure is the recommended maximum initial pressure for elevator 20 (e.g. 60 psi for the embodiment we have described). However, as the user gains experience with elevator 20, it is usually possible for him or her to estimate initial pressures less than the recommended maximum initial pressure that are nevertheless very likely to be greater than needed to support, the maximum balanced external load $L_{BMAX}$, which is about ⅔ of the anticipated maximum load $L_{MAX}$.

A user who has gained experience with elevator 20 can probably perform Step 1 without reading the initial internal pressure from a gage. An experienced user can instead estimate when the initial pressure is sufficient to support $L_{BMAX}$ (about ⅔ of the anticipated maximum load $L_{MAX}$) by observing the swelling of bellows 34. Such an estimate, while crude, will probably be effective for Step 1 if made conservatively so as to favor actual initial pressures somewhat higher than estimated.

After elevator 20 responds at R1 by rising to its maximum height $H_{MAX}$, the user at Step 2 puts the anticipated maximum balanced load $L_{BMAX}$ on elevator 20. The elevator 20 responds at R2 by descending to a height greater than the minimum height.

At Step 3, the user opens valve V as needed to bleed sufficient air from elevator 20 to enable it to just descend to its minimum height $H_{MIN}$. The elevator 20 descends to its minimum height $H_{MIN}$ at R2. The user then at assessing Step 4 tries out elevator 20 to determine if the resulting load heights and stiffness of automatic height adjustment are satisfactory. If they are, the initialization is complete (Step 6). Otherwise, the user proceeds to adjusting Step 5 to add air to or bleed air from elevator 20 to correspondingly increase or decrease elevator 20's height and stiffness. These adjustments of the quantify of air in the system of bellows 34 and reservoir R can be done while there is an external load on elevator 20 and made along a continuum of values. The user then returns to assessing Step 4 and continues as indicated until satisfactory load height and elevator adjustment enable him or her to determine that initialization is complete (Step 6).

In this manner, the user can initialize the pressure of elevator 20 by observation and experiment with the actual maximum balanced load $L_{MAX}$ contemplated without the use of charts or computations and can make adjustments along a continuum.

Whenever there is a major change in the maximum external load $L_{MAX}$ or load density, or the user can reinitialize elevator 20 by using the method of FIG. 18. However, in many cases the user can adjust for even a substantial change in maximum external load $L_{MAX}$ or load density or ambient conditions (e.g. temperature changes) merely by reactivating the modifying routine of Steps 4–6, which can be done with a load on elevator 20. This is particularly helpful if the change is only a temporary one.

For example, an elevator normally operated in an air-conditioned factory is used when the air-conditioning is off. The higher ambient temperature raises the air pressure in bellows 34 and reservoir R. Noticing that elevator 20 is stiffer than usual, the user bleeds out some air. Later, when the air-conditioning is on again and elevator 20's response is not stiff enough, the user inserts additional air.

While the present invention is described with reference to particular embodiments, those skilled in the art will recognize that many variations may be employed without departing from the spirit and scope of the invention as set forth in the claims. For example, bellows 34 could be mechanically coupled between pivot pin 76 and rectangular base 38, in which case it would be convenient to incorporate the air reservoir of fixed volume in structural tube members making up rectangular base 38. While air is an inexpensive and convenient fluid for the system, there may be applications where, with suitable adjustments of the components, a gas other than air can be used, or even a non-gas fluid used in place of air.

What is claimed is:

1. A self-adjusting load elevator comprising:
a base;
a load platform;
a vertically expandable scissors linkage mechanically coupled between the load platform and base;
an air actuator chamber comprising
a compressible bellows,
means for mechanically coupling said compressible bellows to said scissors linkage such that the bellows is adapted to actuate the scissors linkage, and
an air reservoir of fixed volume isobarically air-coupled to said compressible bellows to provide air to the bellows when the bellows expands and to receive back air from the bellows when the bellows contracts, whereby said air reservoir and said bellows have substantially the same air pressure at all times; and
a normally closed air inlet/outlet valve air-coupled to the air actuator chamber.

2. The load elevator of claim 1 wherein the bellows is compressible between specified maximum and minimum bellows volumes and the air reservoir has a fixed volume that is substantial compared to the difference between the maximum and minimum bellows volumes.

3. The load elevator of claim 1 wherein the bellows is compressible between specified maximum and minimum bellows volumes and the air reservoir has a fixed volume that is at least 60% of the difference between the maximum and minimum bellows volumes.

4. The load elevator of claim 1 wherein the bellows is compressible between specified maximum and minimum bellows volumes and the air reservoir has a fixed volume that is at least 85% of the difference between the maximum and minimum bellows volumes.

5. The load elevator of claim 1 wherein the air reservoir is air-coupled to the compressible bellows via damping means disposed therebetween.

6. The load elevator of claim 5 wherein said damping means consists of narrow tubing.

7. The load elevator of claim 1 wherein the air inlet/outlet valve is air-coupled to the air reservoir and the air reservoir is air-coupled by narrow tubing to the compressible bellows.

8. The load elevator of claim 1 wherein the air inlet/outlet valve is air-coupled to the air reservoir by narrow tubing and the air reservoir is air-coupled by narrow tubing to the compressible bellows.

9. The load elevator of claim 1 wherein the load platform comprises a rotator ring for receiving external loads and a sealed tubular member which supports the rotator ring and provides at least a portion of the air reservoir.

10. The load elevator of claim 1 wherein the load platform comprises a horizontal tubular member which is sealed to provide at least a portion of the air reservoir of fixed volume.

11. The load elevator of claim 1 wherein the air reservoir comprises at least two air reservoir chambers air-coupled by narrow tubing.

12. The load elevator of claim 1 wherein the maximum volume to which the bellows can expand is determined by a mechanical stop mechanically coupled to the scissors linkage.

13. The load elevator of claim 1 wherein the minimum volume to which the bellows can be compressed is determined by a mechanical stop mechanically coupled between the base and the load platform.

14. The load elevator of claim 1 wherein expansion of the bellows to its maximum volume expands the scissors linkage to raise the load platform to a predetermined maximum height above the base.

15. A self-adjusting load elevator comprising:
a base;

a load platform;
a vertically expandable scissors linkage mechanically coupled between the load platform and the base;
an air actuator chamber comprising
   a compressible bellows mechanically coupled between the scissors linkage and the load platform, and
   an air reservoir of fixed volume air-coupled to the bellows, the air reservoir being disposed within the load platform; and
a normally closed air inlet/outlet valve air-coupled to the air actuator chamber.

16. The load elevator of claim 15 wherein the scissors linkage has a vertically intermediate pivot and the compressible bellows is mechanically coupled between the load platform and the intermediate pivot.

17. The load elevator of claim 16 wherein the compressible bellows has a lower end affixed to a bellows cup carried by the intermediate pivot and the load elevator includes tilting means coupled between the bellows cup and the base for tilting the bellows cup.

18. The load elevator of claim 17 wherein the tilting means includes a rod coupled between the bellows cup and the base for tilting the bellows cup.

19. The load elevator of claim 15 wherein the load platform comprises a rotator ring for receiving external loads and a sealed tubular member which supports the rotator ring and provides at least a portion of the air reservoir.

20. The load elevator of claim 15 wherein the load platform comprises a horizontal tubular member which is sealed to provide at lease a portion of the air reservoir of fixed volume.

21. The load elevator of claim 15 wherein the air reservoir comprises at least two air reservoir chambers air-coupled by narrow tubing.

22. The load elevator of claim 15 wherein the scissors linkage has a vertically intermediate pivot and the compressible bellows is mechanically coupled between the load platform and the intermediate pivot.

23. The load elevator of claim 22 wherein the compressible bellows has a lower end affixed to a bellows cup carried by the intermediate pivot and the load elevator includes tilting means coupled between the bellows cup and the base for tilting the bellows cup.

24. The load elevator of claim 23 wherein the tilting means includes a rod coupled between the bellows cup and the base for tilting the bellows cup.

25. A self-adjusting load elevator comprising:
a base;
a load platform;
a vertically expandable scissors linkage mechanically coupled between the load platform and the base;
an air actuator chamber comprising
   a compressible bellows,
   means for mechanically coupling said compressible bellows to said scissors linkage such that the bellows is adapted to actuate the scissors linkage, and
   a fluid reservoir of fixed volume isobarically fluidly coupled to said compressible bellows to provide fluid to the bellows when the bellows expands and to receive back fluid from the bellows when the bellows contracts, whereby said fluid reservoir and said bellows have substantially the same fluid pressure at all times; and
a normally closed fluid inlet/outlet valve fluidly coupled to the actuator chamber.

26. The load elevator of claim 25 wherein the fluid reservoir is a gas reservoir gas-coupled to the bellows, and the inlet/outlet valve is a gas valve gas-coupled to the actuator chamber.

27. A self-adjusting load elevator comprising:
a base;
a load platform;
a vertically expandable scissors linkage mechanically coupled between the load platform and the base;
an actuator chamber comprising
   a compressible bellows mechanically coupled between the scissors linkage and the base, and
   an air reservoir of fixed volume isobarically air-coupled to said compressible bellows to provide air to the bellows when the bellows expands and to receive back air from the bellows when the bellows contracts, whereby said air reservoir and said bellows have substantially the same air pressure at all times; and
a normally closed air inlet/outlet valve air-coupled to the air actuator chamber.

28. A self-adjusting load elevator comprising:
a base;
a load platform;
a vertically expandable scissors linkage mechanically coupled between the load platform and the base;
an air actuator chamber comprising
   a compressible bellows mechanically coupled between the scissors linage and the base, and
   an air reservoir of fixed volume air-coupled to the bellows, the air reservoir being disposed within the base, and
a normally closed air inlet/outlet valve air-coupled to the air actuator chamber.

29. The load elevator of claim 28 wherein the base comprises a sealed tubular member which provides at least a portion of the air reservoir.

* * * * *